US008506064B2

(12) United States Patent
Watanabe

(10) Patent No.: US 8,506,064 B2
(45) Date of Patent: Aug. 13, 2013

(54) IMAGE FORMING APPARATUS, METHOD OF CONTROLLING OPERATIONS OF REMOVING AIR BUBBLES AND COMPUTER READABLE INFORMATION RECORDING MEDIUM

(75) Inventor: Tatsuro Watanabe, Miyagi (JP)

(73) Assignee: Ricoh Company, Ltd., Tokyo (JP)

(*) Notice: Subject to any disclaimer, the term of this patent is extended or adjusted under 35 U.S.C. 154(b) by 174 days.

(21) Appl. No.: 13/208,625

(22) Filed: Aug. 12, 2011

(65) Prior Publication Data
US 2012/0050425 A1 Mar. 1, 2012

(30) Foreign Application Priority Data

Aug. 28, 2010 (JP) ................................. 2010-191595

(51) Int. Cl.
*B41J 2/19* (2006.01)
(52) U.S. Cl.
USPC ........................................................ 347/92
(58) Field of Classification Search
USPC ........................................................ 347/92
See application file for complete search history.

(56) References Cited

U.S. PATENT DOCUMENTS

| 4,476,472 A * | 10/1984 | Aiba et al. ..................... 347/92 |
| 7,510,274 B2 * | 3/2009 | Davis et al. ..................... 347/92 |
| 8,336,998 B2 * | 12/2012 | Kuwata et al. .................. 347/85 |
| 8,348,406 B2 * | 1/2013 | Park ............................... 347/89 |
| 2009/0169222 A1 | 7/2009 | Watanabe |
| 2011/0050814 A1 | 3/2011 | Tsubaki et al. |

FOREIGN PATENT DOCUMENTS

| JP | 7-290073 | 11/1995 |
| JP | 2010-131959 | 6/2010 |

* cited by examiner

*Primary Examiner* — Kristal Feggins
(74) *Attorney, Agent, or Firm* — Cooper & Dunham LLP

(57) ABSTRACT

An image forming apparatus includes a recording head part configured to include plural heads configured to discharge liquid droplets and a head tank provided for the plural heads; a distribution member configured to distribute liquid to the respective heads of the recording head part via the head tank; a circulation path configured to return the liquid to the distribution member from the head tank of the recording head part; an air-liquid separation tank, provided in the circulation path, configured to separate air bubbles and the liquid; a circulation pump, provided in the circulation path, configured to send the liquid from the head tank to the distribution member; and a control part configured to control operations of removing air bubbles contained in the head tanks. The control part is configured to drive the circulation pump intermittently.

9 Claims, 13 Drawing Sheets

FIG.6A

| FIG.6A |
| FIG.6C |
| FIG.6D |
| FIG. 6B |

| S11 | S12 | S13 | S14 | S15 | S16 | S17 | S18 |
|---|---|---|---|---|---|---|---|
| INITIAL STATE | SUPPLY INK FROM MAIN TANK | REMOVE AIR FROM HEAD TANK (DRIVE CIRCULATION PUMP WHILE SUPPLYING INK) | REMOVE AIR BUBBLES INCLUDED IN AIR-LIQUID SEPARATION TANK | (REPEAT S13) REMOVE AIR FROM HEAD TANK (DRIVE CIRCULATION PUMP WHILE SUPPLYING INK) | (REPEAT S14) REMOVE AIR BUBBLES INCLUDED IN AIR-LIQUID SEPARATION TANK | SET INK AMOUNT IN SUB-TANK TO BE PROPER AMOUNT | STOP PRESSURIZING OF MAIN TANK |

REPEAT N TIMES (covering S13–S16)

FIG.6B

| MAIN TANK | | PRESSURIZING PUMP | P1 |
|---|---|---|---|
| | | PRESSURE SENSOR | S1 |
| | N/O | ATMOSPHERE OPENING VALVE (SOLENOID VALVE) | V1a |
| | N/C | SOLENOID VALVE | V1 |
| SUB-TANK | | PRESSURIZING PUMP | P2 |
| | | PRESSURE SENSOR | S2 |
| | N/O | ATMOSPHERE OPENING VALVE (SOLENOID VALVE) | V2a |
| | N/O | SOLENOID VALVE | V2 |
| | | SENSOR FILLER (DETECT FILLED UP) | Sf2 |
| AIR-LIQUID SEPARATION TANK | N/C | SOLENOID VALVE | V3 |
| | | CIRCULATION PUMP | P3 |
| MAINTENANCE AND RECOVERY MECHANISM | | SUCTION PUMP | Pi |
| | N/O | SOLENOID VALVE | Vi |
| | | UP-DOWN MOTION MOTOR | Mi |

FIG.6C

| | S11 | S12 | S13 | S14 | S15 | S16 | S17 | S18 |
|---|---|---|---|---|---|---|---|---|
| P1 ON/OFF | OFF | ON | ←CONSTANT PRESSURE CONTROL→ | | | | | OFF |
| S1 PREDETERMINED PRESSURE 0kPa | 0kPa | 15kPa | | | | | | 0kPa |
| V1a OPEN/CLOSE | OPEN | CLOSE | | | | | | OPEN |
| V1 OPEN/CLOSE | CLOSE | | OPEN | | | | CLOSE | |
| P2 ON/OFF | OFF | | | | | | ON | OFF |
| S2 PREDETERMINED PRESSURE 0kPa | 0kPa | | | | | | 16kPa | |
| V2a OPEN/CLOSE | OPEN | | | | | | CLOSE | OPEN |
| V2 OPEN/CLOSE | OPEN | | | | | | CLOSE | OPEN | CLOSE |
| Sf2 ON/OFF | PROPER AMOUNT | | FILLED UP | | | | | PROPER AMOUNT |
| V3 OPEN/CLOSE | CLOSE | | | OPEN | CLOSE | OPEN | CLOSE | |
| P3 ON/OFF | OFF | | | | ON | OFF | | |
| Pi ON/OFF | OFF | | ON | | | | | OFF |
| Vi OPEN/CLOSE | OPEN | | | | | | | |
| Mi UP/DOWN | DOWN | | | | | | | |
| | S12 | | S13 | S14 | S15 | S16 | S17 | S18 |

FIG.6D

| | S12 | S13 | S14 | S15 | S16 | S17 | S18 |
|---|---|---|---|---|---|---|---|
| | SUPPLY INK FROM MAIN TANK | DRIVE CIRCULATION PUMP WHILE SUPPLYING INK FROM MAIN TANK | AFTER CIRCULATION PUMP IS STOPPED, ATMOSPHERE OPENING VALVE FOR AIR-LIQUID SEPARATION TANK IS OPENED WHEN PRE-DETERMINED TIME PERIOD HAS ELAPSED | REPEAT S13 | REPEAT S14 | PRESSURIZING SUB-TANK FOR SETTING INK IN SUB-TANK TO HAVE PROPER AMOUNT | STOP PRESSURIZING MAIN TANK |
| | SUPPLY IS NOT STOPPED EVEN WHEN SUB-TANK IS DETECTED AS HOLDING PROPER AMOUNT (Sf2) | STOP CIRCULATION PUMP WHEN PRE-DETERMINED TIME PERIOD HAS ELAPSED | STOP ATMOSPHERE OPENING VALVE WHEN PRE-DETERMINED TIME PERIOD HAS ELAPSED | REPEAT S13 | REPEAT S14 | STOP PRESSURIZING WHEN SUB-TANK IS DETECTED AS HOLDING PROPER AMOUNT OF INK (Sf2) | STOP SUCTION PUMP IN MAINTENANCE AND RECOVERY MECHANISM |

IMAGE FORMING APPARATUS, METHOD OF CONTROLLING OPERATIONS OF REMOVING AIR BUBBLES AND COMPUTER READABLE INFORMATION RECORDING MEDIUM

BACKGROUND OF THE INVENTION

1. Field of the Invention

The present invention relates to an image forming apparatus, a method of controlling operations of removing air bubbles and a computer readable information recording medium, and relates to operations of removing air bubbles in an image forming apparatus having a recording head that discharges liquid droplets.

2. Description of the Related Art

An image forming apparatus can be, for example, a printer, a facsimile machine, a copier, a plotter, or a multi-function peripheral in which some functions of a printer, a facsimile machine, a copier, a plotter, and so forth, are combined. As such an image forming apparatus, an ink jet recording apparatus is known, for example. An ink jet recording apparatus is known as an image forming apparatus of a liquid discharge recording type using a recording head that is configured as a liquid discharge head (or a liquid droplet discharge head) that discharges ink droplets. In such an image forming apparatus of the liquid discharge recording type, ink droplets are discharged by a recording head onto a sheet of paper that has been conveyed, so that an image is formed on the sheet of paper. The sheet of paper may include not only paper but also an OHP (Over Head Projector) sheet or such. Further, any thing capable of liquid being adhered thereto may be used as the sheet of paper. The sheet of paper may also be referred to as a recording medium, recording paper, or such. Forming an image may also be referred to as recording, printing or such. Image forming apparatuses of the liquid discharge recording type include a serial-type image forming apparatus and a line-type image forming apparatus. The serial-type image forming apparatus is such that a recording head moving in a main scan direction discharges liquid droplets and forms an image. The line-type image forming apparatus is such that a line type recording head is used where the recording head not moving discharges liquid droplets and forms an image.

It is noted that in the present patent application, an "image forming apparatus" of the liquid discharge recording type means an apparatus that discharges liquid to a medium such as paper, thread, fiber, cloth, leather, metal, plastic, glass, wood, ceramics or such. "Forming an image" means not only giving to a medium an image that has a meaning such as a letter, a figure or such, but also giving to a medium an image that does not have a meaning such as a pattern or such (also means merely causing a liquid droplet to land on a medium). "Ink" means not only one called "ink" but is used as a general term of any thing that is capable of being used to form an image and may be referred to as recording liquid, fixing solution, liquid or such. For example, a DNA sample, resist, pattern material, resin, and so forth, are included in "ink". Further, an "image" is not only a planar image but also an image given to a thing that has been formed three-dimensionally, or a statue or such having a three-dimensional shape formed as a result of being molded three-dimensionally or so.

For such an image forming apparatus, it is known to provide an arrangement where an ink supply system is provided to have a distribution member that distributes ink to plural heads, a circulation pump is used to circulate the ink from the distribution member, and the circulated ink is returned to the distribution member after being deaerated (see Japanese Laid-Open Patent Application No. 2010-131959).

However, when ink in which air bubbles are mixed is continuously circulated by a circulation pump, the air bubbles may be dissolved in the ink as finer bubbles, and then, may not positively be separated from the ink in an air-liquid separation tank (deaeration unit). As a result, when the ink is returned to the distribution member, the ink in which the air bubbles are dissolved may be fed to the heads, and thereby, a failure in discharging the ink may occur in the heads. Further, when air bubbles are to be removed from ink in which the air bubbles are dissolved, an amount of the ink that is discharged together with the air bubbles may be increased.

SUMMARY OF THE INVENTION

According to an embodiment of the present invention, an image forming apparatus has a recording head part that includes plural heads that discharge liquid droplets and a head tank provided for the plural heads; a distribution member that distributes liquid to the respective heads of the recording head part via the head tank; a circulation path that returns the liquid to the distribution member from the head tank of the recording head part; an air-liquid separation tank, provided in the circulation path, configured to separate air bubbles and the liquid; a circulation pump, provided in the circulation path, configured to send the liquid from the head tank to the distribution member; and a control part configured to control operations of removing the air bubbles contained in the head tank. The control part drives the circulation pump intermittently.

According to another embodiment of the present invention, a method of controlling operations of removing air bubbles contained in a head tank provided for plural heads of a recording head part in an image forming apparatus is provided. In the image forming apparatus, the heads of the recording head part discharge liquid droplets. The liquid is distributed by a distribution member to the plural heads via the head tank. The method includes driving a circulation pump intermittently. The circulation pump is provided in a circulation path provided to return the liquid from the head tank to the distribution member. The circulation pump sends the liquid to the distribution member from the head tank. An air-liquid separation tank is provided in the circulation path and separates the air bubbles from the liquid.

According to yet another embodiment of the present invention, a non-transitory computer readable information recording medium is provided, which tangibly embodies a program which, when executed by one or plural computer processors, performs a method of controlling operations of removing air bubbles contained in a head tank provided for plural heads of a recording head part in an image forming apparatus. In the image forming apparatus, the heads of the recording head part discharge liquid droplets. The liquid is distributed by a distribution member to the heads via the head tank. The method includes driving a circulation pump intermittently. The circulation pump is provided in a circulation path provided to return the liquid from the head tank to the distribution member. The circulation pump sends the liquid to the distribution member from the head tank. An air-liquid separation tank is provided in the circulation path and separates the air bubbles from the liquid.

Other objects, features and advantages of the present invention will become more apparent from the following detailed description when read in conjunction with the accompanying drawings.

BRIEF DESCRIPTION OF THE DRAWINGS

FIGS. 6A, 6B, 6C and 6D show a timing chart of the operations of removing air bubbles controlled by the control part.

DETAILED DESCRIPTION OF THE EMBODIMENT

An object of an embodiment of the present invention is to positively separate air bubbles from liquid and reduce image degradation occurring due to a failure in discharging liquid droplets from heads.

Figure 1:
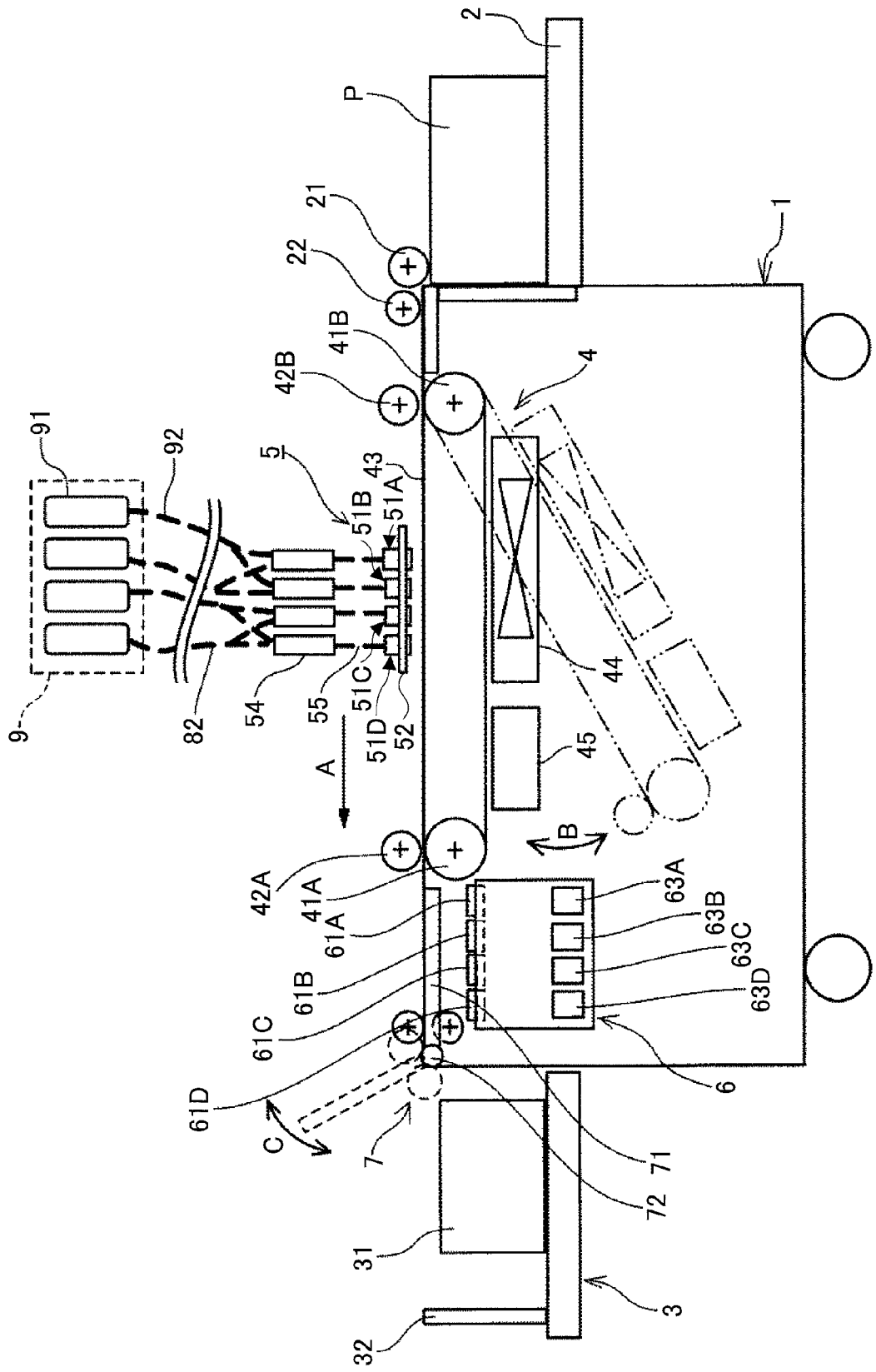
FIG. 1 is a front general view illustrating an entire configuration of one example of an image forming apparatus according to an embodiment of the present invention.
Figure 2:
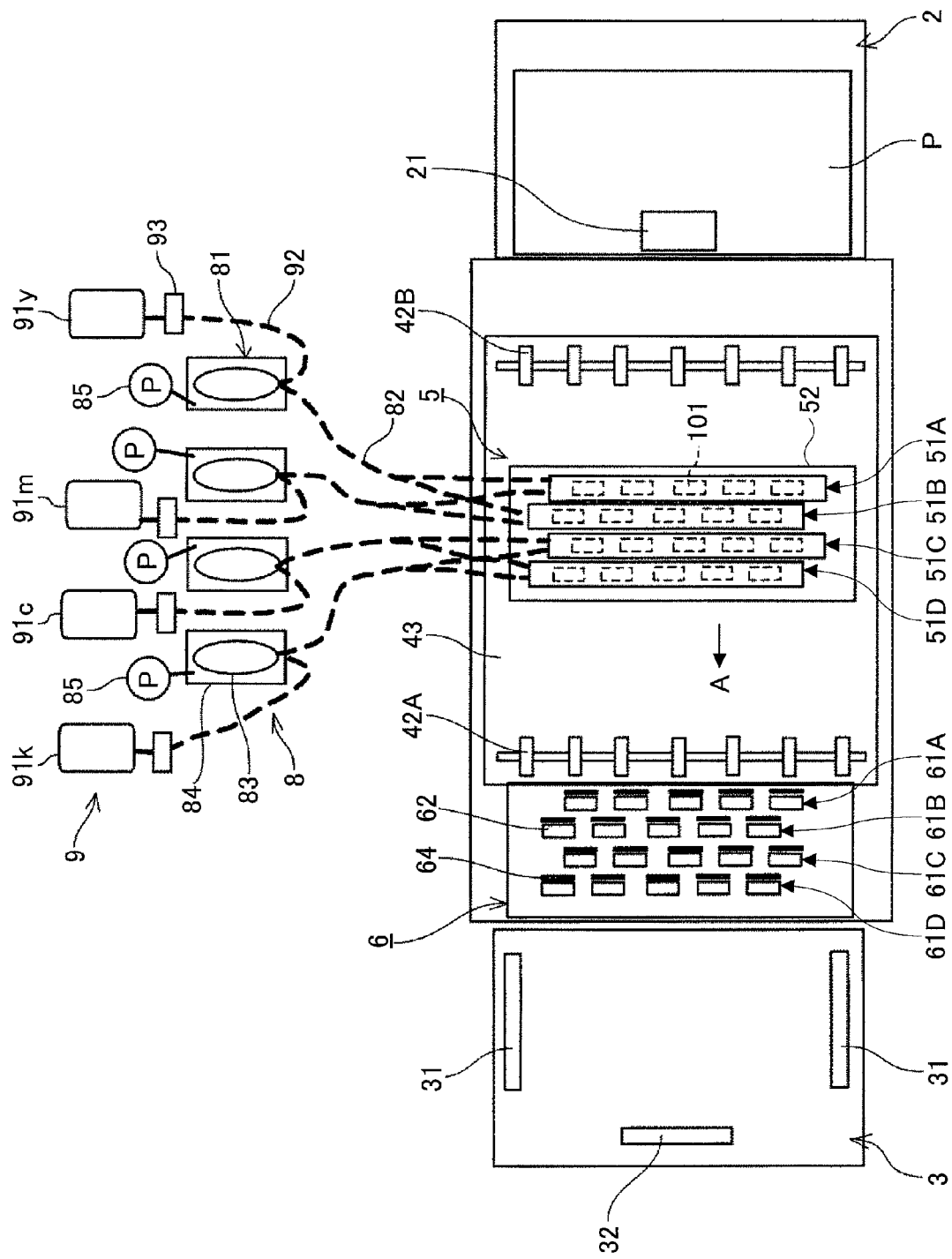
FIG. 2 is a plan view partially illustrating the image forming apparatus.

Below, the embodiment of the present invention will be described with reference to figures. First, one example of an image forming apparatus according to the embodiment of the present invention having liquid discharge head units will be described with reference to FIGS. 1 and 2. FIG. 1 is a front general view illustrating an entire configuration of one example of the image forming apparatus. FIG. 2 is a plan view partially and schematically illustrating the image forming apparatus.

The image forming apparatus is of a line type image forming apparatus, and includes an apparatus body 1, a paper supply tray 2, a paper ejection tray 3, a conveyance unit 4, an image forming unit 5, a head cleaning unit 6, a conveyance guide part 7, an ink tank unit 8, and a main tank unit 9. Sheets of paper P are stacked on the paper supply tray 2 which supplies the sheets of paper P, sheet by sheet. The sheets of paper P, on which printing has been carried out and which have been ejected, are stacked on the paper ejection tray 3. The conveyance unit 4 conveys the sheets of paper P from the paper supply tray 2 to the paper ejection tray 3, sheet by sheet. The image forming unit 5 includes head modules 51A, 51B, 51C and 51D acting as recording heads that discharge liquid droplets of inks and print an image onto the sheet of paper P conveyed by the conveyance unit 4. The head cleaning unit 6 is a maintenance and recovery mechanism that carries out maintenance and recovery of respective heads included in the image forming unit 5 after printing or at a desired timing. The conveyance guide part 7 opens and closes the head cleaning unit 6. The ink tank unit 8 includes sub-tanks that supply the inks to the head modules 51A, 51B, 51C and 51D of the image forming unit 5. The main tank unit 9 supplies the inks to the ink tank unit 8.

The apparatus body 1 includes front, rear and side panels, and stays (not shown), and the sheets of paper P stacked on the paper supply tray 2 are supplied, sheet by sheet, to the conveyance unit 4 by a separation roller 21 and a supply roller 22.

The conveyance unit 4 includes a conveyance driving roller 41A, a conveyance driven roller 41B, and an endless conveyance belt 43 wound on between these rollers 41A and 41B. On a surface of the conveyance belt 43, plural suction holes (not shown) are formed, and a suction fan 44 that suctions the sheet of paper P is disposed below the conveyance belt 43. Further, above the conveyance driving roller 41A and the conveyance driven roller 41B, conveyance guide rollers 42A and 42B are held by guide members (not shown) and are in contact with the conveyance belt 43 by their own weights, respectively.

The conveyance belt 43 is rotated to move as a result of being driven by the conveyance driving roller 41A that is rotated by a motor (not shown). The sheet of paper P is attracted to the surface of the conveyance belt 43 by the suction fan 44, and is conveyed as a result of the conveyance belt 43 being thus rotated to move. It is noted that the conveyance driven roller 41B and the conveyance guide rollers 42A, 42B are rotated as being driven by the conveyance belt 43. Further, below the conveyance belt 43 is disposed a dummy discharge cleaning unit 45, which removes the liquid droplets that adhere to the conveyance belt 43 through a dummy discharging operation.

Above the conveyance unit 4, the image forming unit 5 including the plural head modules 51A, 51B, 51C and 51D that discharge the liquid droplets thereby carrying out printing onto the sheet of paper P is disposed. The conveyance unit 4 is provided in such a manner of being able to move in an A direction (indicated by an arrow) (and also in the opposite direction). The image forming unit 5 is moved to be over the cleaning unit 6 at a time of maintenance and recovery operations (at a time of cleaning), and is returned to the position shown in FIG. 1 at a time of forming an image (at a time of printing).

The image forming unit 5 has the head modules (or recording head units) 51A, 51B, 51C and 51D mounted onto a line base member 52, side by side, along the paper conveyance direction A. In each of the head modules 51A, 51B, 51C and 51D, recording head parts (which will be referred to as "head units", hereinafter) 101 are arranged in one line. In each of the head units 101, plural heads that discharge the liquid droplets and head tanks are unified.

Each of the head units 101 included in the head modules 51A and 51B has two nozzle rows; yellow (Y) liquid droplets are discharged by one of the two nozzle rows, and magenta (M) liquid droplets are discharged by the other of the two nozzle rows. Each of the head units 101 included in the head modules 51C and 51D also has two nozzle rows; cyan (C) liquid droplets are discharged by one of the two nozzle rows, and black (K) liquid droplets are discharged by the other of the two nozzle rows. That is, in the image forming unit 5, the two head modules 51A and 51B and the two head modules 51C and 51D discharging liquid droplets of the same respective two colors are disposed, side by side, in the paper conveyance direction A, and each of the two head modules 51A and 51B and the two head modules 51C and 51D act as nozzle rows for one line corresponding to a width of the sheet of paper P.

Above the head modules 51A, 51B, 51C and 51D, distribution tanks (hereinafter, referred to as "distributors") 54 are disposed for the respective ones of the head modules 51A, 51B, 51C and 51D. The distributors 54 act as distribution members that supply the inks to the respective head units 101. Tubes 55 are used to connect between the distributors 54 and the head units 101, respectively. On the upstream side of the distributors 54, the sub-tanks 81 are disposed and are connected with the distributors 54 via supply tubes 82. On the upstream side of the sub-tanks 81, main tanks 91y, 91m, 91c and 91k storing the respective inks are disposed, and supply paths of supply tubes 92 are used to connect between the main tanks 91y, 91m, 91c and 91k and the sub-tanks 81, respectively.

On the downstream side of the conveyance unit 4, the conveyance guide part 7 that ejects the sheet of paper P to the paper ejection tray 3 is provided. The sheet of paper P conveyed while being guided by the conveyance guide part 7 is ejected to the paper ejection tray 3. The paper ejection tray 3 has a pair of side fences 31 and an end fence 32. The side fences 31 control a position of the sheet of paper P in width directions, and the end fence 32 controls a position of the leading edge of the sheet of paper P.

The maintenance and recovery mechanism (head cleaning unit) 6 has four rows of cleaning parts 61A, 61B, 61C and 61D disposed to correspond to the respective head modules 51A, 51B, 51C and 51D of the image forming unit 5. Each of the cleaning parts 61A, 61B, 61C and 61D includes cap members 62 and wiping members (wiper member) 64 to correspond to respective ones of the head units 101. The cap members 62 cap the nozzle faces of the head units 101 and the wiper members 64 wipe the nozzle faces of the head units 101. It is noted that the cap members 62 are configured so that the cap members 62 of the cleaning parts 61A, 61B, 61C and 61D are capable of moving up and down independently for each row. Under the cleaning parts 61A, 61B, 61C and 61D, suction pumps 63A, 63B, 63C and 63D are disposed. The suction pumps 63A, 63B, 63C and 63D are suction parts that suction the inks from the nozzles in a condition where the nozzle faces of the head units 101 are capped by the cap members 62.

Further, in the image forming apparatus, in certain cases, as shown in FIG. 1 (indicated by long dashed short double-dashed lines in FIG. 1), the entirety of the conveyance unit 4 is rotated downward in a direction of an arrow B around the driven roller 41B acting as a supporting point, after printing is stopped. Thereby, a space between the image forming unit 5 and the conveyance unit 4 is made larger in comparison to a time of forming an image (a time of printing). Thereby, a moving space of the image forming unit 5 is ensured. The certain cases include a case where after completion of printing, the inks are suctioned from the nozzles in a state where the nozzle faces of the respective head units 101 of the head modules 51A, 51B, 51C and 51D that discharge the inks are capped by the cleaning parts 61A, 61B, 61C and 61D. The certain cases further include a case where the wiper members 64 are used to clean the inks adhering to the nozzle faces of the respective head units 101 of the head modules 51A, 51B, 51C and 51D. In these cases, also a conveyance guide plate 71 of the conveyance guide part 7 disposed above the head cleaning unit 6 is rotated upward around a supporting point 72 in a direction of an arrow C, and thus, the top of the head cleaning unit 6 is opened (as indicated by broken lines in FIG. 1). The certain cases further include a case of carrying out operations of removing air bubbles contained in the head tank 202, as will be described later with reference to FIGS. 5, 6A, 6B, 6C, 7, 8, 9 and 10.

Then, after the conveyance unit 4 and the conveyance guide part 7 are thus removed, the image forming unit 5 is moved in the paper conveyance direction (the direction of the arrow A), is stopped at a position over the head cleaning unit 6, the cleaning parts 61A, 61B, 61C and 61D are raised, and thus, operations of cleaning the respective head modules 51A, 51B, 51C and 51D (maintenance and recovery operations) are started.

Figure 3:
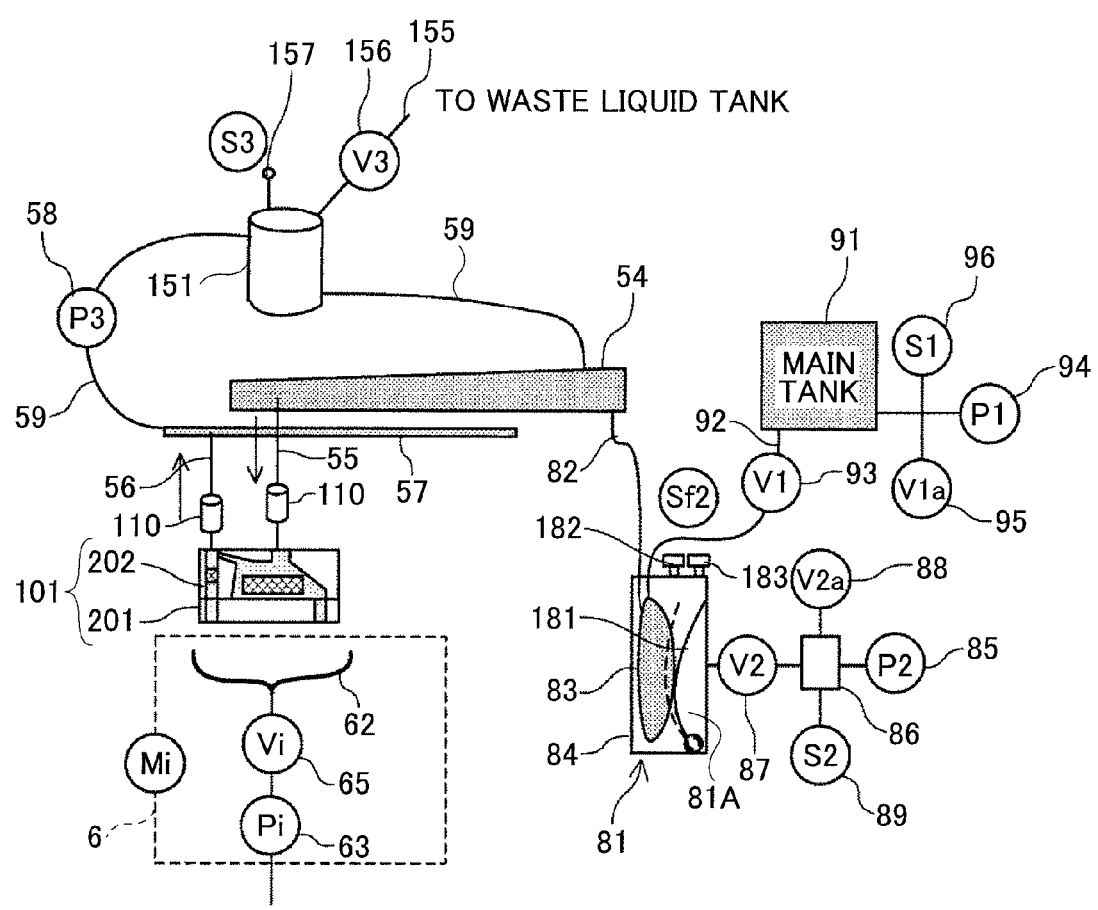
FIG. 3 illustrates an ink supply system of the image forming apparatus.

Next, details of an ink supply system including a circulation system of the image forming apparatus will be described with reference to FIG. 3.

The ink supply system of the image forming apparatus includes mainly the main tank 91y, 91m, 91c or 91k (which will be generally referred to as the main tank 91), the sub-tank 81, the distributor 54, and the head unit 101. The ink in the main tank 91 is supplied to the sub-tank 81 via the supply tube 92, is then supplied to the distributor 54 from the sub-tank 81 via the supply tube 82, and then is distributed and supplied to each of the head tanks 202 from the distributor 54 via the tube 55. A negative pressure suitable for maintaining meniscus of the nozzles of the head unit 101 is generated from a difference in head (−20 through −70 mmAq) between the sub-tank 81 and the nozzle face of the head unit 101. The head unit 101 includes the heads 201 that discharge the inks and the head tanks 202 that supply the inks to the heads 201, respectively.

The main tank 91 is pressurized by air by a pressurizing pump 94 (P1), and control is carried out such that a pressure sensor 96 (S1) indicates a predetermined pressure. As a result of the main tank 91 being thus pressurized by air, the ink in the main tank 91 is pressed out toward the sub-tank 81. Further, a solenoid valve 95 (V1a) for opening the main tank 91 to the atmosphere and the pressure sensor 96 (S1) are provided to the main tank 91, and therewith, the main tank 91 is opened to the atmosphere by the solenoid valve 95 (V1a) when the main tank 91 comes to have a pressure equal to or more than the predetermined pressure. Thus, the main tank 91 can be maintained to have the predetermined pressure.

A solenoid valve (ink supply valve) 93 (V1) is inserted in the supply path (92) from the main tank 91 to the sub-tank 81. Supplying and stopping the supplying of the ink to the sub-tank 81 from the main tank 91 can be controlled as a result of the solenoid valve 93 being opened and closed.

The sub-tank 81 is a pack-type sub-tank. That is, the sub-tank 81 has a pack (i.e., an ink bag) 83 that holds the ink, has flexibility and has a variable volume in an airtight case 84. The pack-type sub-tank 81 is configured so that the ink is prevented from directly coming into contact with the atmosphere, and evaporation of the water contained in the ink is avoided so that an increase in the viscosity of the ink is avoided. Further, the amount of the dissolved oxygen in the ink is kept in a fixed value so that air bubbles are prevented from occurring in the head unit 101.

Further, a pressuring pump 85 that pressurizes a space 81A between the pack 83 and the case 84 is connected to the sub-tank 81 via a chamber 86 (or a tube pump as the pressurizing pump 85 is connected to the chamber 86). Further, a solenoid valve 87 (V2) is provided between the space 81A and the chamber 86 to open and close the path therebetween. Further, a solenoid valve 88 (V2a) for opening the chamber 86 to the atmosphere and a pressure sensor 89 (S2) are provided. Therewith, the space 81A is opened to the atmosphere by the solenoid valve 88 (V2a) when the space 81A comes to have a pressure equal to or more than a predetermined pressure. Thus, the space 81A can be maintained to have the predetermined pressure.

Further, in the sub-tank 81, a filler (i.e., a displacement member or a detection member) 181 that follows and is displaced by the pack 83 is provided to detect the amount of liquid (ink) held by the pack 83. In the outside of the case 84, a lower limit sensor 182 that detects that the filler 181 is at a lower limit position and an upper limit sensor 183 (Sf2) that detects that the filler 181 is at an upper limit position are provided. Control is carried out in such a manner that when the lower limit sensor 182 detects the filler 181, the ink supply valve 93 is opened and the ink is supplied to the sub-tank 81. When the upper limit sensor 183 detects the filler 181, the ink supply valve 93 is closed and supply of the ink is stopped. Thus, supply of the ink to the sub-tank 81 from the main tank 91 is controlled.

Further, in a case of a pressurization for the purpose of maintenance and recovery of the nozzles of the head unit 101, after the pressure in the chamber 86 is increased to the predetermined pressure by the pressurizing pump 85, the pressure is applied at once to the space 81A in the sub-tank 81 by opening the solenoid valve 87 (V2). Thereby, the pressure of air is applied to the pack 83 sharply, and the ink is pressed out toward the head unit 101.

The supply tube 55 for supplying the ink is connected between the head tank 202 of the head unit 101 and the distributor 54.

Further, in order to return the ink contained in the heads 201 and the head tanks 202 of each head unit 101 to the distributor 54, discharge tubes 56 for discharging the ink are connected with the ink tanks 202. The respective discharge tubes 56 are connected together by a circulation manifold 57, and are connected to the distributor 54 via a circulation path 59.

An air-liquid separation tank 151 that separates air bubbles and liquid and a circulation pump 58 that feeds the ink from each head tank 202 to the distributor 54 are provided in the circulation path 59. The circulation pump 58 is provided to the side near the head tank 202 with respect to the air-liquid separation tank 151.

An atmosphere opening path 155 is connected to the air-liquid separation tank 151, and an atmosphere opening valve 156 is connected to the atmosphere opening path 155. A waste liquid tank (not shown) is connected to the other end of the atmosphere opening path 155. Further, a liquid surface detection sensor 157 (S3) is connected to the air-liquid separation tank 151.

Further, in the head cleaning unit (maintenance and recovery mechanism) 6 (Mi), a solenoid valve 65 (Vi) that switches the cap member 62 to carry out suction is provided between the cap members 62 that cap the nozzle faces of the head units 101 and the suction pump 63A, 63B, 63C or 63D (which will be generally referred to as the suction pump 63).

Figure 4:
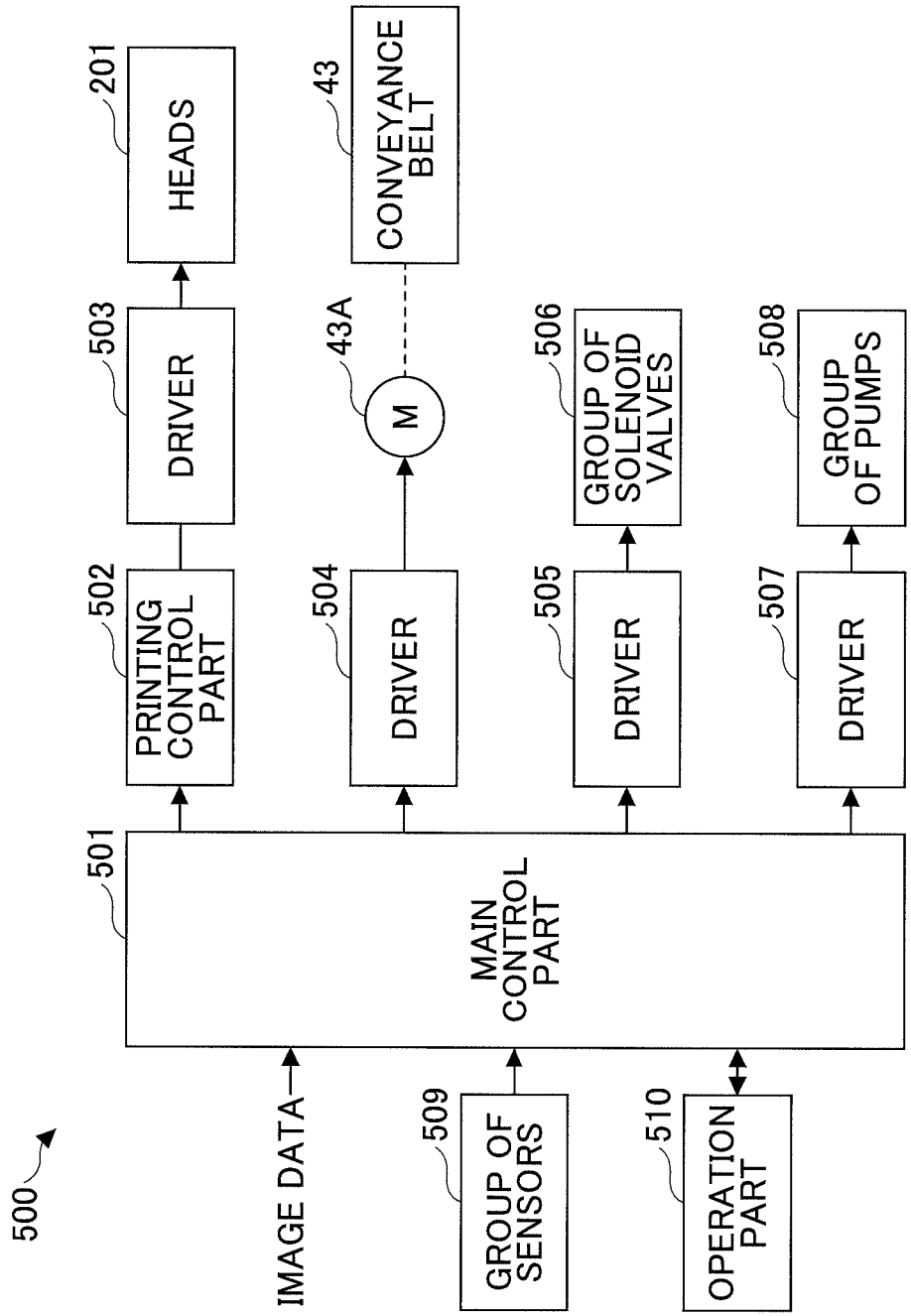
FIG. 4 is a block diagram illustrating an outline of a control part of the image forming apparatus.

Next, an outline of a control part 500 in the image forming apparatus will be described with reference to FIG. 4.

The control part 500 of the image forming apparatus includes a main control part 501 (system controller) that includes a microcomputer, an image memory and a communication interface (which are not shown). The main control part 501 carries out control of the entirety of the image forming apparatus, and also acts as a control part for controlling the operations of removing air bubbles. The control of the operations of removing air bubbles is carried out as a result of a CPU included in the microcomputer executing a program stored in a ROM also included in the microcomputer.

The main control part 501 sends data for printing to a printing control part 502 for forming an image (printing) on a sheet of paper P based on image data and various sorts of command information transferred from an external information processing apparatus (on a host side, not shown).

The printing control part 502 generates data for driving pressure generation parts (not shown) for causing the respective heads 201 of the head units 101 to discharge liquid droplets based on a printing data signal received from the main control part 501. The printing control part 502 transfers various signals for transferring and fixing the transfer of the generated data to a head driver 503. The printing control part 502 includes a storing part (not shown) storing data of driving waveforms; a driving waveform generation part (not shown) including a D-A converter that carries out digital-to-analog conversion of the data of driving waveforms, a voltage amplifier and a current amplifier; and a selection part (not shown) selecting driving waveforms to be given to the head driver 503. The printing control part 502 generates the driving waveforms each including one driving pulse (driving signal) or plural driving pulses (driving signal), outputs the generated driving waveforms, and drives and controls the respective heads 201.

Further, the main control part 501 drives and controls, via a motor driver 504, a paper feeding motor 43A that rotates and moves the conveyance belt 43.

Further, the main control part 501 drives and controls (opening and closing) a group of solenoid valves 506 via a driver 505, and drives and controls a group of pumps 508 via a driver 507. The group of solenoid valves 506 includes the above-mentioned solenoid values 93, 95, 87, 88, 65 and 156. The group of pumps 508 includes the above-mentioned pumps 94, 85, 63 and 58.

Further, detection signals from a group of sensors 509 including various sensors are input to the main control part 501. The group of sensors 509 includes the above-mentioned sensors 96, 89, 182, 183 and 157. Further, the main control part 501 carries out inputting and outputting various sorts of information and inputting and outputting display information from and to an operation part 510. It is noted that the user of the image forming apparatus operates the operation part 510 to input data and instructions to the image forming apparatus, for example. From the operation part 510, the user obtains the operating states of the image forming apparatus, for example.

Next, the operations of removing air bubbles in the image forming apparatus that is configured as described above will be described with reference to a flowchart of FIG. 5, a timing chart of FIGS. 6A, 6B, 6C and 6D, and state transitions shown in FIGS. 7, 8, 9 and 10.

<Air Bubble Occurring State> (See "Initial State" in Step S11 in FIGS. 6*a*, 6*b* and 6*c*, and FIG. 7)

Figure 7:
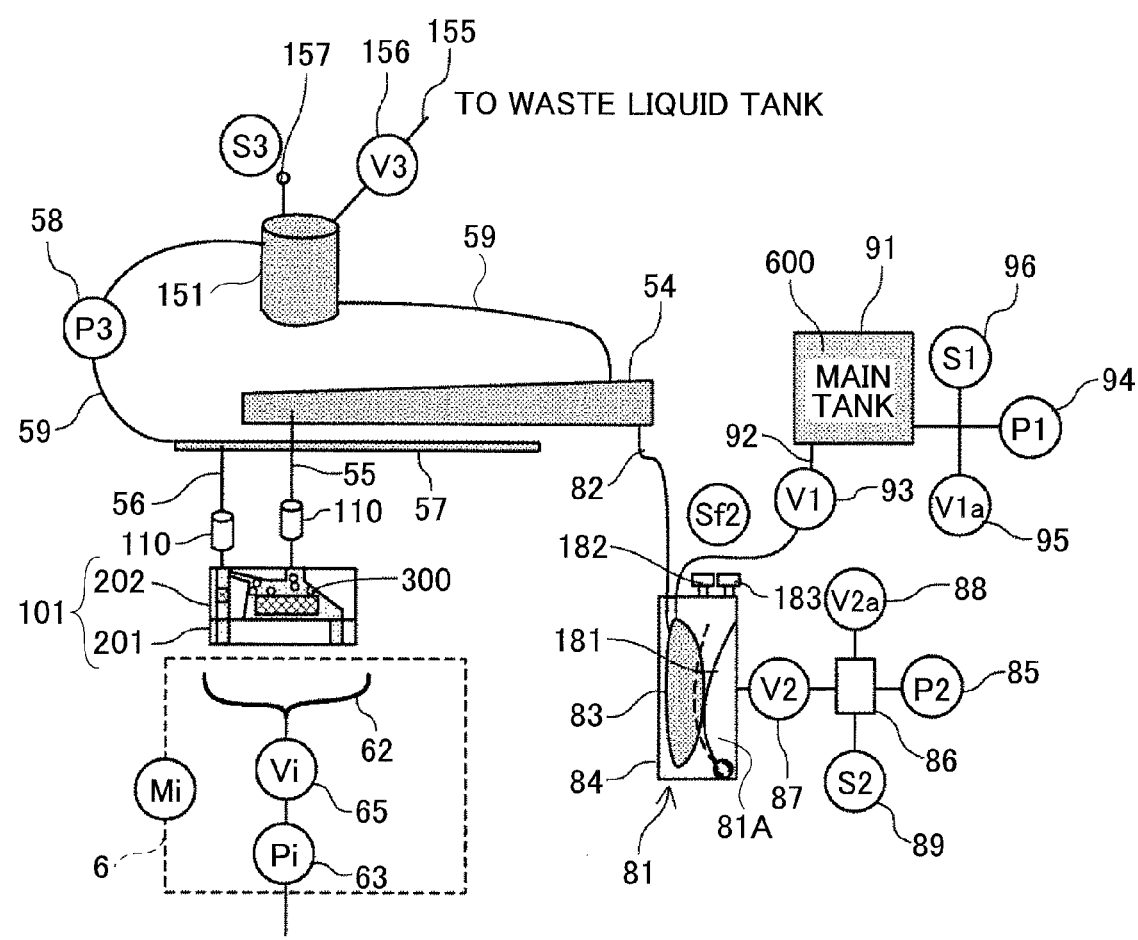
FIGS. 7, 8, 9 and 10 show state transitions of the ink supply system of the image forming apparatus during the operations of removing air bubbles controlled by the control part.

While the image forming apparatus is being used, air bubbles 300 occur in each head tank 202, as shown in FIG. 7. The air bubbles 300 in the head tank 202 cannot be pressed out from the nozzles of the heads 201 and cannot be naturally discharged to the distributor 54 on the upstream side.

Figure 5:
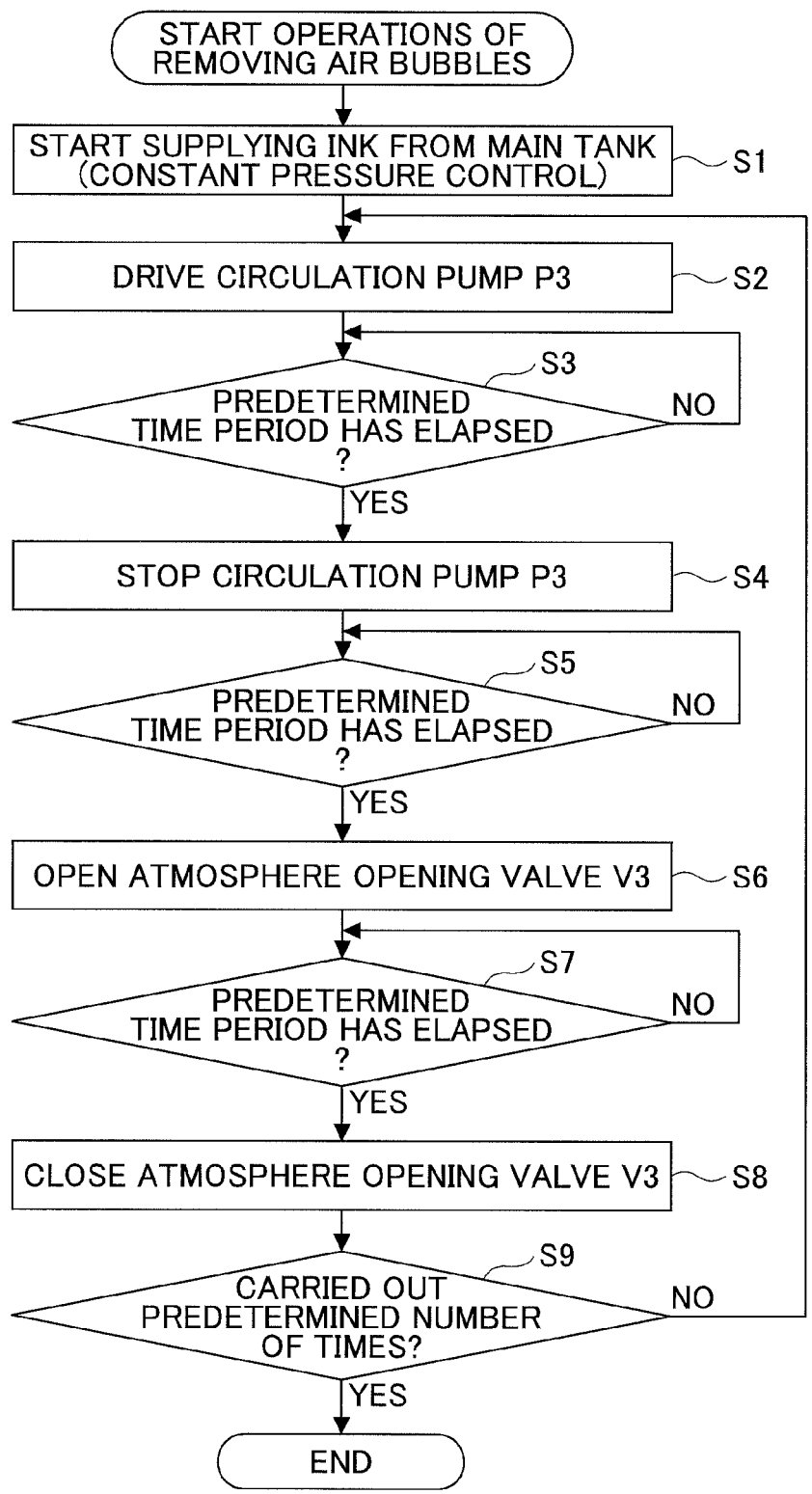
FIG. 5 is a flowchart illustrating operations of removing air bubbles controlled by the control part.

<Operations of Removing Air Bubbles> (See FIG. 5, Steps S12 Through S16 in FIGS. 6*a*, 6*b*, 6*c* and 6*d*, and FIGS. 8, 9 and 10)

It is noted that before starting the operations of removing air bubbles, the image forming unit 5 is moved in the paper conveyance direction A to the position over the head cleaning unit 6, as in the case of the above-mentioned maintenance and recovery operations. Thus, the heads 201 of the head units 101 of the image forming unit 5 are positioned over the cap members 62 of the head cleaning unit 6. It is noted that during the operations of removing air bubbles, an up-down motion motor (not shown) that raises the cleaning parts 61A-61D of the head cleaning unit 6 is controlled so that the cleaning parts 61A-61D are not raised.

Then, the operations of removing air bubbles are started. First, in step S12 of FIGS. 6A, 6B, 6C and 6D, in a state where the main tank (ink cartridge) 91 is set in the apparatus body 1, the atmosphere opening valve 95 (V1*a*) of the main tank 91 is closed. After that, the pressurizing pump 94 (P1) of the main tank 91 is turned on, and thus the maim tank 91 is pressurized until the pressure sensor 96 (S1) of the main tank 91 indicates a predetermined pressure (15 kPa). Then, the pressure in the main tank 91 is controlled to be the predetermined pressure (15 kPa) as a result of the atmosphere opening valve 95 (V1*a*) being opened when the pressure in the main tank 91 exceeds the predetermined pressure (15 kPa) and this matter is detected by the pressure sensor 96 (S1).

Next, still in step S12, the ink supply valve 93 (V1) on the downstream side of the main tank 91 is opened, and the ink 600 is fed to the sub-tank 81 from the main tank 91 (step S1 in FIG. 5). It is noted that during the operations of removing air bubbles, even when the upper limit sensor 183 (Sf2) of the sub-tank 81 detects the filler 181, the ink supply valve 93 (V1) is kept open and the ink is continuously supplied to the sub-tank 81 from the main tank 91 through the ink supply valve 93 (V1) even after the upper limit is reached. As a result, the ink amount in the pack 83 of the sub-tank 81 is increased to exceed the upper limit (to be a "filled up position" indicated by FILLED UP in FIGS. 6B and 6C).

This ink 600 is then supplied via the distributor 54 from the sub-tank 81 to the head tank 202 and then to the heads 201. It is noted that at this time, the ink may drip from the heads 201. However, the dripped ink is received by the cap members 62 that are positioned under the heads 201 as mentioned above, and is fed to the not-shown waste liquid tank by the suction pump 63 (Pi) which has been started in step S12 as shown in FIGS. 6B and 6C.

Figure 8:
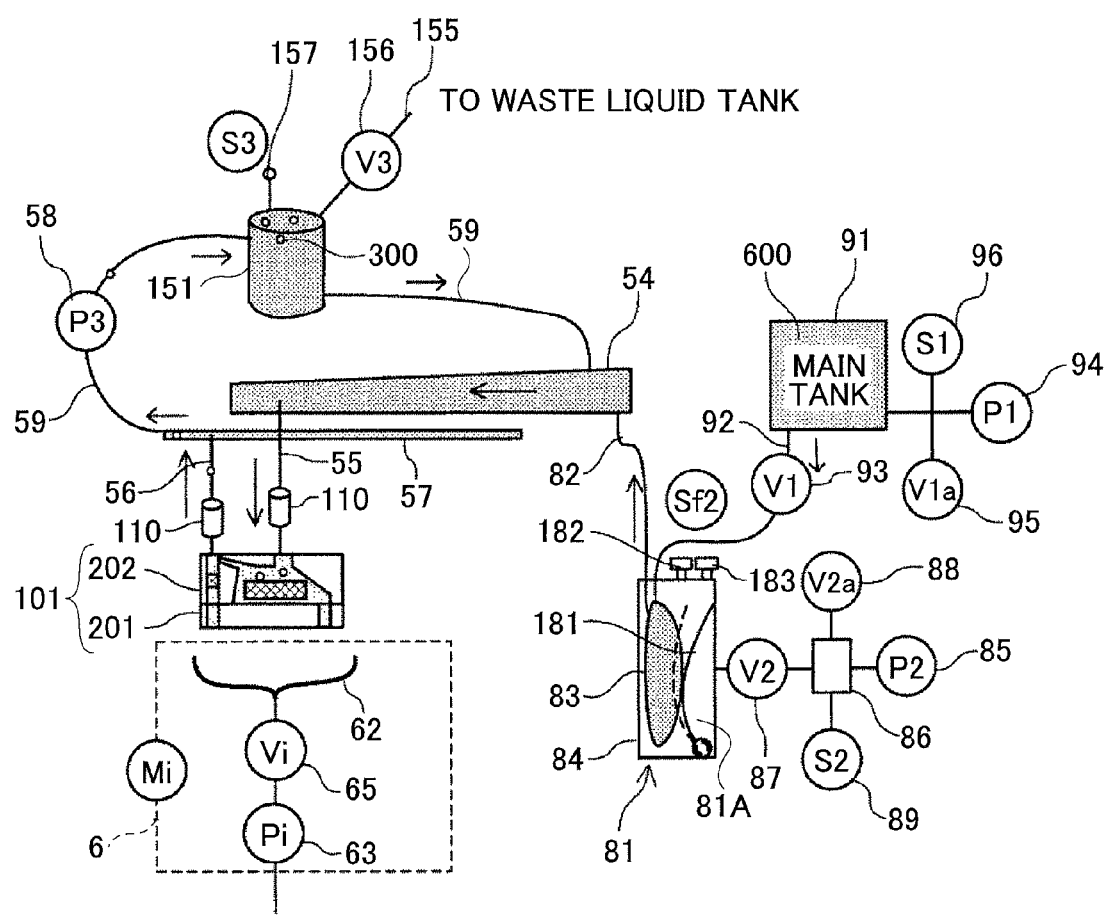

After that, in step S13 of FIGS. 6A, 6B, 6C and 6D, and in step S2 of FIG. 5, the circulation pump 58 is driven, and the ink and the air bubbles 300 contained in the head tank 202 are sent to the air-liquid separation tank 151 (see FIG. 8).

The ink and the air bubbles 300 thus sent to the air-liquid separation tank 151 are separated into the ink and the air bubbles 300 in the air-liquid separation tank 151. The air bubbles 300 are collected to the top part of the air-liquid separation tank 151, and therefore, only the ink is returned to the distributor 54 from the bottom part of the air-liquid separation tank 151 (see FIG. 8).

The ink thus returned to the distributor 54 will be supplied to the head tank 202 again together with the ink currently being supplied from the main tank 91 to the distributor 54 via the sub-tank 81.

Figure 9:
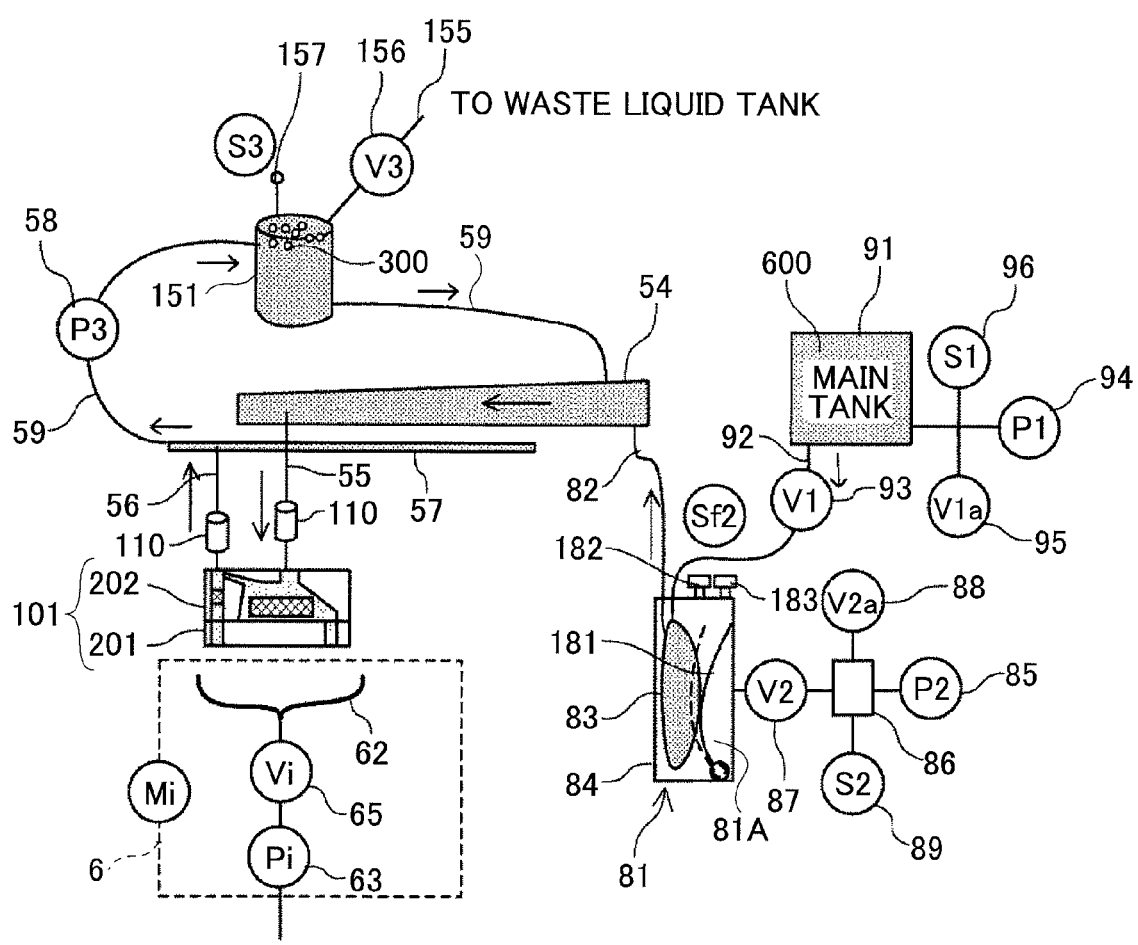

Then, when the circulation pump 58 is driven for a predetermined time period (for example, 3 through 5 seconds), more of the air bubbles 300 are collected in the air-liquid separation tank 151 (see FIG. 9). It is noted that the predetermined time period of driving the circulation pump 58 in step S13 of FIGS. 6A, 6B, 6C and 6D and in step S2 of FIG. 5 may be measured or instead the number of revolutions of the circulation pump 58 (i.e., the number of the corresponding driving pulses) may be counted by the main control part 501.

After the circulation pump 58 is thus driven for the predetermined time period, the circulation pump 58 is stopped once (still in step S13 of FIGS. 6A, 6B, 6C and 6D, and step S3—YES and step S4 of FIG. 5).

Then, after a predetermined time period has elapsed after the stopping of the circulation pump 58, the atmosphere opening valve 156 (V3) of the air-liquid separation tank 151 is opened (step S14 of FIGS. 6A, 6B, 6C and 6D, and step S5—YES and step S6 of FIG. 5).

Figure 10:
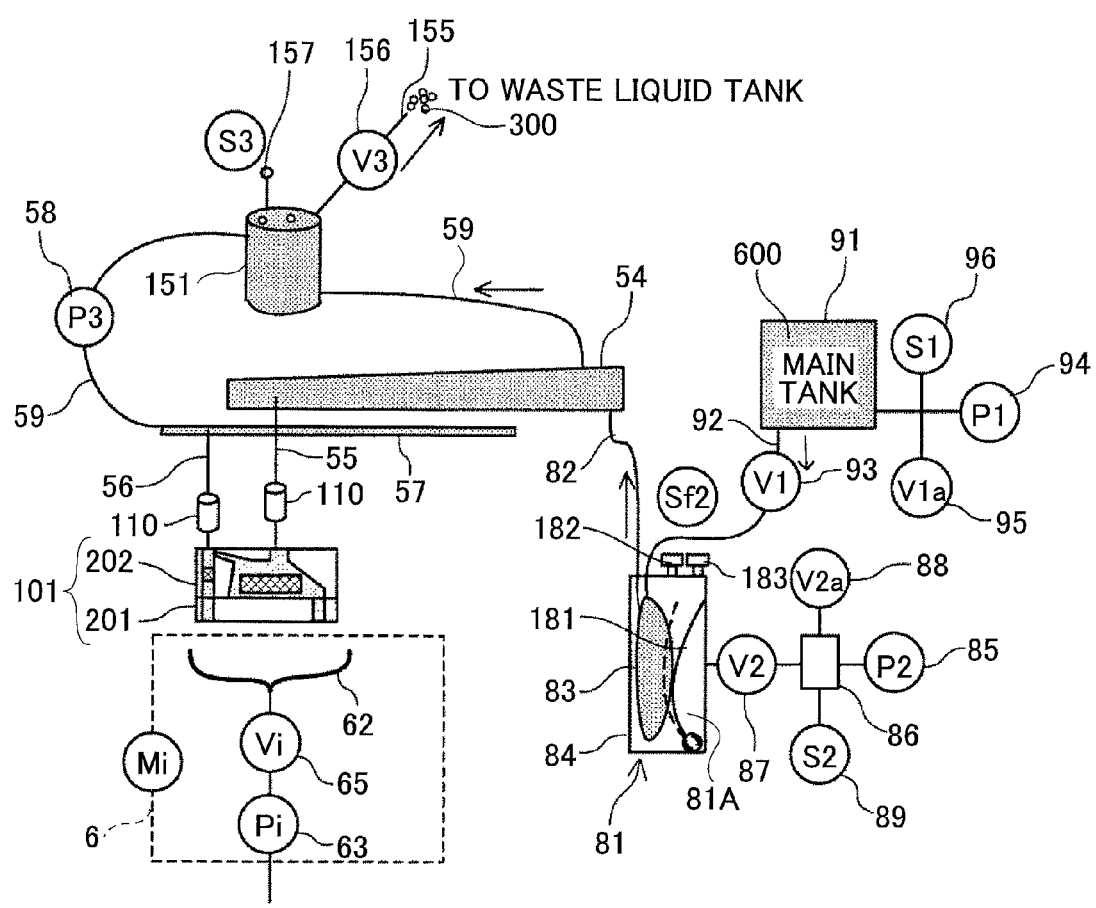

Thereby, the ink supplied from the main tank 91 is switched in its flow direction from the air-liquid separation tank 151 to the distributor 54, to the flow direction from the distributor 54 to the air-liquid separation tank 151 (see FIG. 10).

That is, as mentioned above, in step S5 of FIG. 5 and in step S13 of FIGS. 6A, 6B, 6C and 6D, the predetermined time period (for example, 2 seconds) is made to elapse from when the circulation pump 58 is stopped to when the atmosphere opening valve 156 is opened. By elongating this elapsed time period, it is possible to create a time period for the air bubbles 300 to rise in the air-liquid separation tank 151. As a result, it is possible to easily discharge (remove) the air bubbles 300 (i.e., to easily and positively carry out separating the air bubbles and the ink).

Further, as a result of the ink from the main tank 91 being supplied to the air-liquid separation tank 151 via the distributor 54 (see FIG. 10), the air bubbles 300 collected at the top of the air-liquid separation tank 151 are discharged to the not-shown waste liquid tank through the atmosphere opening path (discharge opening) 155, since the atmosphere opening valve 156 has been opened (in step S6 in FIG. 5 and in step S14 of FIGS. 6A, 6B, 6C and 6D).

After that, when a predetermined time period (for example, 3 through 5 seconds) has elapsed, the atmosphere opening valve 156 is closed (still in step S14 in FIGS. 6A, 6B, 6C and 6D, and step S7—YES and S8 in FIG. 5). Then, the circulation pump 58 is again driven (in step S15 of FIGS. 6A, 6B, 6C and 6D, and step S9—NO and step S2 again of FIG. 5).

The above-mentioned series of operations, i.e., driving the circulation pump 58 (in steps S2-S3 of FIG. 5), stopping the circulation pump (in step S4) and separating the air bubbles 300 and the ink (in steps S5-S8) are repeated a predetermined number of times (in step S9—NO and step S2 of FIG. 5 and steps S15 and S16 of FIGS. 6A, 6B, 6C and 6D). Thus, the air bubbles 300 in the head tank 201 are discharged (removed).

After the above-mentioned series of operations are completed the predetermined number of times (in step S9—YES of FIG. 5), steps S17 and S18 in FIGS. 6A, 6B, 6C and 6D are carried out.

In step S17, the ink supply valve 93 (V1), the atmosphere opening value 88 (V2a) and the valve 87 (V2) are closed, respectively, and the pressurizing pump 85 (P2) is driven. Since the atmosphere opening value 88 (V2a) and the valve 87 (V2) are thus closed, the pressurizing pump 85 (P2) pressurizes the chamber 86. Then, when the pressure sensor 89 (S2) indicates that the pressure in the chamber 86 has reached a predetermined pressure (16 kPa), the valve 87 (V2) is opened, and thus, the pressure in the chamber 86 is applied to the space 81A between the pack 83 and the case 84 of the sub-tank 81. As a result, the ink in the pack 83 is pressed out toward the head unit 101. The pressure in the space 81A in the sub-tank 81 is controlled to be the predetermined pressure (16 kPa) as a result of the atmosphere opening valve 88 (V2a) being opened when the pressure in the space 81A detected by the pressure sensor 89 (S2) via the chamber 86 exceeds the predetermined pressure (16 kPa).

As a result of the amount of the ink in the pack 83 being thus reduced, the filler 181 becomes not detected by the upper limit sensor 183 (Sf2). In response thereto, in step S18, the valve 89 (V2) is closed, the pressurizing pump 85 (P2) is stopped, and the atmosphere opening valve 88 (V2a) is opened. Thus, the ink amount in the sub-tank 81 is set at a proper amount.

After that, still in step S18, the suction pump 63 (Pi) in the head cleaning unit 6 is stopped. After that, the pressurizing pump 94 (P1) of the main tank 91 is stopped, and the atmosphere opening valve 95 (V1a) of the main tank 91 is opened. Thus, the pressurizing of the main tank 91 is stopped.

It is noted that during the regular state of the image forming apparatus in which printing operations of the heads 201 discharging liquid droplets to form an image on the sheet of paper P may be carried out, the following control is carried out.

The pressure of the main tank 91 is controlled to be the predetermined pressure (15 kPa) as the pump 94 (P1) is continuously driven, and the atmosphere opening valve 95

(V1a) is opened when the pressure in the main tank 91 detected by the pressure sensor 96 (S1) exceeds the predetermined pressure (15 kPa).

The ink amount of the sub-tank 81 is controlled to be the proper amount or to fall within the proper amount range as the ink supply valve 93 (V1) is closed when the filler 181 is detected by the upper limit sensor 183 (Sf2) and is opened when the filler is detected by the lower limit sensor 182. Further, the pressure in the space 81A between the pack 83 and the case 84 of the sub-tank 81 is controlled to be the predetermined pressure (16 kPa) as the valve 87 (V2) is kept opened, the pump 85 (P2) is continuously driven, and the atmosphere opening valve 88 (V2a) is opened when the pressure in the space 81A detected via the chamber 86 by the pressure sensor 89 (S2) exceeds the predetermined pressure (16 kPa).

Therefore, when the ink amount of the sub-tank 81 is reduced as a result of the ink being consumed by the printing operations, the filler 181 is moved from the position of being detected by the upper limit sensor 183 (Sf2) to the position of being detected by the lower limit sensor 182. Then, when the filler 181 is thus detected by the lower limit sensor 182, the ink supply valve 93 (V1) is opened, and the ink is supplied from the main tank 91 to the sub-tank 81. As a result, the ink amount of the pack 83 is increased, and thus, the filler 181 becomes detected by the upper limit sensor 183 (Sf2). In response thereto, the ink supply valve 93 (V1) is closed.

The reason for intermittently operating (driving) the circulation pump 58 (repeating the driving and stopping of the circulation pump 58) is as follows. If the circulation pump 58 were driven continuously, the air bubbles 300 and the ink sent to the air-liquid separation tank 151 would be circulated continuously. Thereby, the air bubbles 300 would be dissolved into the ink to become finer bubbles, and thus, it might be difficult to discharge (remove) only the air bubbles.

Thus, in the embodiment of the present invention, by providing the configuration in which the circulation pump 58 is driven intermittently, it is possible to control mixing the air bubbles 300 and the liquid (ink) together in the air-liquid separation tank 151, in comparison to a case where the circulation pump 58 were driven continuously. As a result, it is possible to positively separate the air bubbles 300 from the liquid (ink), and thus, it is possible to avoid degradation in an image formed by the image forming apparatus, which degradation may occur due to a failure of discharging liquid droplets from the heads 201.

It is noted that the above-mentioned embodiment has been described as an example in which the embodiment of the present invention is the line-type image forming apparatus. However, an embodiment of the present invention can also be a serial-type image forming apparatus in the same way.

The present invention is not limited to the specifically disclosed embodiment, and variations and modifications may be made without departing from the scope of the present invention.

The present patent application is based on Japanese Priority Patent Application No. 2010-191595 filed Aug. 28, 2010, the entire contents of which are hereby incorporated herein by reference.

What is claimed is:

1. An image forming apparatus comprising:
a recording head part configured to include plural heads configured to discharge liquid droplets and a head tank provided for the plural heads;
a distribution member configured to distribute liquid to the respective heads of the recording head part via the head tank;
a circulation path configured to return the liquid to the distribution member from the head tank of the recording head part;
an air-liquid separation tank, provided in the circulation path, configured to separate air bubbles and the liquid;
a circulation pump, provided in the circulation path, configured to send the liquid from the head tank to the distribution member; and
a control part configured to control operations of removing the air bubbles contained in the head tank, wherein
the control part is configured to drive the circulation pump intermittently.

2. The image forming apparatus as claimed in claim 1, further comprising:
an atmosphere opening valve configured to open the air-liquid separation tank to the atmosphere, wherein
the control part is configured to control
a first operation of driving the circulation pump to send the liquid in which air bubbles are mixed to the air-liquid separation tank from the head tank, and after that, stopping the circulation pump, and
a second operation of, after the stopping the circulation pump, opening the atmosphere opening valve to open the air-liquid separation tank to the atmosphere after a predetermined time period has elapsed, and then closing the atmosphere opening valve.

3. The image forming apparatus as claimed in claim 2, wherein
the control part is configured to carry out the first operation and the second operation, plural times.

4. A method of controlling operations of removing air bubbles contained in a head tank provided for plural heads of a recording head part in an image forming apparatus, the plural heads discharging liquid droplets, and liquid being distributed by a distribution member to the plural heads via the head tank, the method comprising:
driving a circulation pump intermittently, the circulation pump being provided in a circulation path provided to return the liquid from the head tank to the distribution member, the circulation pump sending the liquid to the distribution member from the head tank, and an air-liquid separation tank being provided in the circulation path and separating the air bubbles from the liquid.

5. The method as claimed in claim 4, further comprising:
driving the circulation pump to send the liquid in which the air bubbles are mixed to the air-liquid separation tank from the head tank, and after that, stopping the circulation pump, and
after the stopping the circulation pump, opening the atmosphere opening valve to open the air-liquid separation tank to the atmosphere after a predetermined time period has elapsed, and then closing the atmosphere opening valve.

6. The method as claimed in claim 5, further comprising:
carrying out operations of the driving the circulation pump, the stopping the circulation pump, the opening the atmosphere opening valve, and the closing the atmosphere opening valve, plural times.

7. A non-transitory computer readable information recording medium storing a program which, when executed by one or plural computer processors, performs a method of controlling operations of removing air bubbles contained in a head tank provided for plural heads of a recording head part in an image forming apparatus, the heads discharging liquid droplets, and liquid being distributed by a distribution member to the plural heads via the head tank, the method comprising:

driving a circulation pump intermittently, the circulation pump being provided in a circulation path provided to return the liquid from the head tank to the distribution member, the circulation pump sending the liquid to the distribution member from the head tank, and an air-liquid separation tank being provided in the circulation path and separating the air bubbles from the liquid.

8. The computer readable information recording medium as claimed in claim 7, the method further comprising:

driving the circulation pump to send the liquid in which the air bubbles are mixed to the air-liquid separation tank from the head tank, and after that, stopping the circulation pump, and after the stopping the circulation pump, opening the atmosphere opening valve to open the air-liquid separation tank to the atmosphere after a predetermined time period has elapsed, and then closing the atmosphere opening valve.

9. The computer readable information recording medium as claimed in claim 8, the method further comprising:

carrying out operations of the driving the circulation pump, the stopping the circulation pump, the opening the atmosphere opening valve, and the closing the atmosphere opening valve, plural times.

* * * * *